Patented Dec. 3, 1940

2,223,549

UNITED STATES PATENT OFFICE 2,223,549

TREATMENT OF CASHEW NUT SHELL LIQUID

Mortimer T. Harvey, East Orange, N. J., assignor to The Harvel Corporation, a corporation of New Jersey No Drawing. Application November 5, 1937, Serial No. 172,998

7 Claims. (Cl. 260—624)

The present invention relates to new compositions of matter and to methods and steps of making and using the same; and the present invention relates, more particularly, to new chemical compounds and derivatives thereof prepared from cashew nut shell liquid and to methods and steps for making and using the same.

Cashew nut shell liquid is described in the literature as consisting of about ninety per cent of anacardic acid, $C_{22}H_{32}O_3$ and about ten per cent of cardol, $C_{32}H_{52}O_4$, with very small fractional percentages of other materials.

According to the present invention, the cashew nut shell liquid is distilled at a greatly reduced pressure or in a stream of steam at atmospheric pressure to produce a compound having a molecular weight of 288, a boiling point of 225° C. at about 10 millimeters of mercury, an empirical formula of $C_{20}H_{32}O$, and a probable structural formula of $C_{14}H_{27}C_6H_4OH$. Characteristics and reactions indicate that this compound is a phenol with all or part of the $C_{14}H_{27}\cdot$ atoms together as one radical in the meta position with respect to the ·OH radical and with one unsaturated bond,

somewhere in the $C_{14}H_{27}\cdot$ atoms. This production of the new compound apparently takes place by the breaking down of the anacardic acid. Hereinafter, the new compound is called Cardanol.

When cashew nut shell liquid is distilled in air at normal pressure it is cracked into a number of compounds, including cardanol, having various boiling points over a wide range; specifically, cashew nut shell liquid distilled in air at normal pressure comes over in a temperature range extending from about 310° C. (580° F.) to about 398° C. (750° F.). The distillate is redistilled at a pressure of about ten millimeters of mercury at which pressure the cardanol comes over at about 225° C. and thereby is separated from the other compounds of the distillate. In this respect the present application is a continuation of my copending application Serial Number 489,484, filed October 17, 1930, and allowed August 7, 1933 and issued as Patent Number 1,950,085, issued March 6, 1934.

However, when cashew nut shell liquid is distilled at a reduced pressure of about ten millimeters of mercury the cardanol comes over at a constant boiling point of about 225° C. with a very little amount of other compounds. When the cardanol itself is distilled at normal pressure the boiling point of about 360° C. is constant and when it is distilled at ten millimeters of mercury the boiling point of about 225° C. is constant. In the distillation of cardanol in air a small amount of darkening compounds is formed if the hot cardanol or vapors thereof come in contact with the air. When the cardanol is distilled from cashew nut shell liquid at atmospheric pressure while steam is blown through the cashew nut shell liquid, as an illustrative example, a temperature of about 270° C. is maintained and the product, cardanol, comes over uniformly, actually in the form of an emulsion, the water of the condensed steam being dispersed in the new compound.

Due to conditions of removing cashew nut shell liquid from the cashew nut shells, the proportion of cardanol obtained from a given amount of cashew nut shell liquid varies with the condition of the cashew nut shell liquid. That is to say, in all present commercial methods of obtaining cashew nut shell liquid from the cashew nuts heat is used, either to char or carbonize the shells for opening them or for expelling the shell liquid from the shells, and the degrees of temperature at which these methods are carried out are such that decomposition of the cashew nut shell occurs with the production of compounds, such as catechol, which distill over with the cardanol and which turn dark on exposure to the light. This is a great disadvantage because most of the uses to which cardanol are put require a light color in the final product, for example, in coatings, varnishes, molded compositions, bottlecap paper, electrical insulation, and so on. Further, the greater the degree of purity of the cardanol the greater is the suitability of the product for its uses.

Naturally, the amount of cardanol obtainable from cashew nut shell liquid depends upon the conditions to which the cashew nut shell liquid has been subjected previous to its treatment to obtain cardanol, and more cardanol is obtainable from cashew nut shell liquid which is extracted from the nuts at low temperature than from cashew nut shell liquid which has been excessively heated. From low temperature extracted cashew nut shell liquid the proportion of cardanol can be as high as 70% or more while from cashew nut shell liquid obtained by some methods still in use the proportion is as low as 40 to 50%.

According to the present invention, this disadvantage is overcome either by obtaining the cashew nut shell liquid at normal temperature as by solvent extraction or by keeping the nuts at a comparatively low temperature when heating to expell the shell liquid, for example, at below 200° C.; also, the difficulty is overcome by changing the darkening compounds which go over with the cardanol into compounds which will not go over with it. These darkening compounds can be saturated to produce compounds which will not distill over at the temperatures at which cardanol is distilled. This I do by blowing air, oxygen, or hydrogen through the cashew nut shell liquid before it is distilled to take off cardanol or by blowing the cardanol with these same materials before it is redistilled for purification, this blowing being done with the cashew nut shell liquid or the cardanol on the alkaline side or with a catalyst such as copper-nickel for the hydrogen.

Illustrative examples of methods of preparing cardanol are given below together with descriptions of these materials and statements of their uses.

1. Cashew nut shell liquid is obtained from the shells of cashew nuts at a low temperature by removing the shells from the kernels and extracting the shell liquid at normal temperature with a solvent such as benzol, after which the benzol is distilled off. Or cashew nut shell liquid is expelled from the shells by immersing cashew nuts for about four minutes in a bath of cashew nut shell liquid which is at a temperature of about 165° C. The expelled shell liquid will mingle with the liquid of the bath and for this reason the liquid of the bath should be in a pure state, obtained, for example, by either the extraction or expulsion method just descr'bed.

The cashew nut shell liquid obtained at a low temperature in this manner is distilled with steam at about 270° C. through a condenser at which temperature cardanol comes over with the water of the condensed steam emulsified therein, the water being the dispersed phase. Upon standing most of the emulsion breaks, but heat is applied to about 90° C. to completely break the emulsion, after which the cardanol and the water are separated. When it is so desired, the cardanol is further purified by distilling at the reduced pressure of about ten millimeters of mercury.

Also, the cardanol is obtained from the cashew nut shell liquid obtained at low temperature by one or more distillations at about ten millimeters of mercury, the number of distillations being determined by the degree of purity desired in the cardanol.

2. When cardanol is to be prepared from cashew nut shell liquid which is obtained by some of the commercial methods still in use and in which excessive heating is employed to expel the shell liquid from the nuts, it contains compounds which contain active unsaturated bonds and which turn dark upon exposure to the light, such as catechol, for example. These are broken off from the cashew nut shells by the excessive heating. To obtain cardanol which is free of these darkening compounds the methods of steam distillation and/or of distillation at ten millimeters of mercury, as above described, are used, but previous to one or more of the distillation steps the cashew nut shell liquid or the cardanol is blown with air, oxygen, hydrogen or other suitable gas to saturate the unsaturated bonds and to obtain compounds which have higher boiling points than the cardanol and which do not go over with the cardanol when the latter is distilled. This blowing is done on the alkaline side for which caustic soda in amount about one to two per cent of the weight of the cashew nut shell liquid or cardanol is added before the blowing is begun. Examples of time and temperature for this blowing are for about two or three hours at about 80° to 100° C., but other periods and temperatures can be employed. Ammonia and potassium hydroxide are other illustrative examples of materials for putting the material on the alkaline side.

3. To a given weight of raw cashew nut shell liquid from about one-half per cent to about two per cent by weight of concentrated sulphuric acid are added with about an equal volume of water and stirred in and the mixture heated to about 325° F. under a reflux condenser and cooled, to precipitate salts of metals naturally occurring in cashew nut shell liquid and leaving the cashew nut shell liquid in the liquid condition, that is the polymerization, if any should be only to a slight degree. This material is then ready for distillation under vacuum or with steam in the manner above described for the purpose of obtaining cardanol and distillation residue in the manner above described. Various equivalents of sulphuric acid set forth above and in addition thereto alkyl sulphates such as di-ethyl sulphate and mono-ethyl acid sulphate and the corresponding other alkyl sulphates can be used in place of or in addition to the concentrated sulphuric acid. In one case one per cent by weight of concentrated sulphuric acid and one per cent by weight of di-ethyl sulphate are added to a given weight of raw cashew nut shell liquid and heated in the manner above described for obtaining the treated cashew nut shell liquid suitable for distillation according to the present invention. In such and similar cases water is not used for diluting the sulphuric acid because the alkyl sulphate such as di-ethyl sulphate serves this purpose and avoids the necessity of removing the water to permit the action of the treating agent.

Methods and materials for the treatment of cashew nut shell liquid to precipitate salts therefrom and to produce a degree of polymerization when desired are shown in Patent 2,067,919, issued January 19, 1937, to Harvey and Damitz, and also in application Ser. No. 109,470 of S. Caplan.

In addition to the alkyl sulphates and mono-alkyl acid sulphates cited above as equivalents for sulphuric acid in the precipitation of metals from cashew nut shell liquid and in the polymerization of cashew nut shell liquid the following can be used, either alone or in mixtures of two or more of them, (including the sulphuric acid and the equivalents set forth above): hydrochloric acid, phosphorous oxychloride, zinc chlorine, stannic chloride, aluminum chloride and phosphoric acid.

Metals occurring naturally in cashew nut shell liquid, either in chemical combinations or in the uncombined state, include, among others, sodium, potassium, calcium, magnesium, iron and lead.

It is to be understood that the metals and salts precipitated from the cashew nut shell liquid can be removed therefrom by means of a centrifuge or a filter press or other suitable means or methods.

When cashew nut shell liquid is treated with concentrated sulphuric acid or its equivalents such as is set forth above or in said patent or in said copending application of Caplan and particularly when the salts are entirely removed therefrom before the cashew nut shell liquid is distilled, then the distillate is lighter in color and a higher yield is obtained. The higher yield is obtainable because heat polymerization or thickening in the still is retarded or reduced so that the higher percentage of distillate is obtained before the residue thickens up to a condition in which it is a rubber-like solid when cooled to normal temperatures. This is particularly true when the steam distillation method is used, for example, at a temperature of between about 250° F. and 300° F.

Another method for saturating the darkening compounds before one of the distilling steps is to heat the cashew nut shell liquid or cardanol with an oxidizing agent such for example as sodium perborate. About one or two per cent of the weight of the cashew nut shell liquid or cardanol in sodium perborate, and at about 270° C. for about two to three hours are examples of amount, temperature and time of heating.

Another method of getting cardanol free of darkening compounds is to wash the cashew nut shell liquid or the cardanol with water, for example, in scrubbing towers or by shaking with water and separating the cashew nut shell liquid or cardanol from the water solution of the darkening compounds. This washing can be followed by a distillation step, if desired or required as in the distillation of the cashew nut shell liquid or for further purification of the cardanol.

Characteristics of cardanol

Molecular weight ........................ 288
Empirical formula ....................... $C_{20}H_{32}O$ Accepted structural formula ............. $C_6H_4 \begin{smallmatrix} OH \\ C_{14}H_{17} \end{smallmatrix}$ (1,3)

Index of refraction ..................... $N_D^{25}$ 1.5112
Boiling point ........................... About 225° C. at ten millimeters of mercury
Melting point ........................... Below minus 20° C. at normal pressure
Density ................................. 0.930 at 20° C.
Color (in liquid state) ................. Straw color

Uses of cardanol

Cardanol is useful for making coatings such as paints, varnishes, lacquers, and so on, for impregnating compounds, for molded compounds and these products are also highly suitable for electrical insulation, for chemical and water and moisture proofings. Cardanol can be reacted with formaldehyde, hexamethylene tetramine, paraformaldehyde, paint and varnish driers such as manganese resinate, lead oxides including litharge, metal-organic driers such as cobalt acetate and copper oleate, and other reactions such as are shown for cashew nut shell liquid reactions in my patents listed below, to which reference is hereby made. The present invention is an improvement on the inventions disclosed in these patents and the products of cardanol have further advantages than the cashew nut shell liquid itself, for example, the cardanol-cresol-formaldehyde condensation products are soluble to a greater extent in linseed and China-wood oils than are the cashew nut shell liquid-cresol-formaldehyde condensation products; cardanol is more effective as a solvent and plasticiser for cellulose esters such as nitro-cellulose, cellulose acetate and for the latter, known to be difficultly plasticised, it is a very good plasticiser.

Following is a list of patents issued to me and cited to give examples of the application of products of the invention: Patents Nos. 1,725,791 to 1,725,797, inclusive, issued August 27, 1929; 1,771,785 and 1,771,786 issued July 29, 1930; 1,819,416 issued August 18, 1931; 1,838,070 to 1,838,077, inclusive, issued December 22, 1931; 1,921,292 and 1,931,293 issued August 8, 1933; 1,939,301 issued December 12, 1933; and 1,939,773 issued December 19, 1933.

This is a continuation in part of my copending application Ser. No. 703,414 filed December 21, 1933, and issued as Patent 2,098,824 on November 9, 1937, which latter is a continuation in part of my application Ser. No. 489,484 filed October 17, 1930, and issued as Patent No. 1,950,085 on March 6, 1934.

Having thus described my invention, what I claim as new and desire to protect by Letters Patent is:

1. The method which comprises the step of heating cashew nut shell liquid with an agent having the characteristic of polymerizing cashew nut shell liquid when heated therewith, said step being conducted until a thickening of the cashew nut shell liquid is achieved and being discontinued at a point at which the treated cashew nut shell liquid is still liquid at normal temperature, and the subsequent step of destructively distilling the thickened cashew nut shell liquid under conditions to obtain a phenol having an unsaturated hydrocarbon substituent having about fourteen carbon atoms, which phenol has a boiling point of about 225° C. at about ten millimeters of mercury.

2. The method which comprises the step of heating cashew nut shell liquid with an agent having the characteristic of polymerizing cashew nut shell liquid when heated therewith, said step being conducted until a thickening of the cashew nut shell liquid is achieved and being discontinued at a point at which the treated cashew nut shell liquid is still liquid at normal temperature, and the subsequent step of destructively distilling the thickened cashew nut shell liquid with steam at atmospheric pressure to obtain a phenol having an unsaturated hydrocarbon substituent having about fourteen carbon atoms, which phenol has a boiling point of about 225° C. at about ten millimeters of mercury.

3. The method which comprises the step of heating cashew nut shell liquid with an agent having the characteristic of polymerizing cashew nut shell liquid when heated therewith, said step being conducted until a thickening of the cashew nut shell liquid is achieved and being discontinued at a point at which the treated cashew nut shell liquid is still liquid at normal temperature, and the subsequent step of destructively distilling the thickened cashew nut shell liquid at a pressure in the neighborhood of about ten millimeters of mercury to obtain a phenol having an unsaturated hydrocarbon substituent having about fourteen carbon atoms, which phenol has a boiling point of about 225° C. at about ten millimeters of mercury.

4. The method which comprises removing the metals occurring naturally in cashew nut shell liquid by heating cashew nut shell liquid with an agent having an inorganic negative radicle which will combine with said metals and subsequently destructively distilling to obtain a phenol which has an unsaturated side chain and which has a boiling point of about 225° C. at a pressure of about ten millimeters of mercury.

5. The method which comprises removing the metals occurring naturally in cashew nut shell liquid by heating cashew nut shell liquid with an agent having an inorganic negative radicle which will combine with said metals and destructively distilling at a pressure in the neighborhood of ten millimeters of mercury.

6. The method which comprises heating cashew nut shell liquid with material selected from the group consisting of sulphuric acid, dialkyl sulphate, and monoalkyl acid sulphate until a thickening of the cashew nut shell liquid is achieved and discontinued at a point at which the so treated cashew nut shell liquid is still a liquid at normal temperature, and the subsequent step of destructively distilling the said so treated cashew nut shell liquid to obtain a phenol having an unsaturated hydrocarbon substituent having about fourteen carbon atoms, which phenol has a boiling point of about 225° C. at about ten millimeters of mercury.

7. The method which comprises precipitating metals occurring naturally in cashew nut shell liquid by heating cashew nut shell liquid with an agent having an inorganic negative radicle which will combine with said metals and destructively distilling the so treated cashew nut shell liquid with steam.

MORTIMER T. HARVEY.